(12) United States Patent
Matsumoto et al.

(10) Patent No.: US 11,325,544 B2
(45) Date of Patent: May 10, 2022

(54) PROTECTOR WITH SENSOR

(71) Applicants: NISHIKAWA RUBBER CO., LTD., Hiroshima (JP); AISIN SEIKI KABUSHIKI KAISHA, Kariya (JP)

(72) Inventors: Michihiko Matsumoto, Hiroshima (JP); Wataru Hattori, Kariya (JP)

(73) Assignees: NISHIKAWA RUBBER CO., LTD., Hiroshima-Ken (JP); AISIN SEIKI KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/027,806

(22) Filed: Sep. 22, 2020

(65) Prior Publication Data

US 2021/0109246 A1   Apr. 15, 2021

(30) Foreign Application Priority Data

Oct. 10, 2019 (JP) .............................. JP2019-187136

(51) Int. Cl.
*B60R 16/023* (2006.01)
*B60J 5/06* (2006.01)
(Continued)

(52) U.S. Cl.
CPC ............. *B60R 16/0232* (2013.01); *B60J 5/06* (2013.01); *E05F 15/44* (2015.01); *B60J 5/0493* (2013.01); *G01V 3/00* (2013.01)

(58) Field of Classification Search
CPC ......... E05F 15/44; E05F 15/42; B60J 5/0495; B60J 5/06; H01H 3/142; B60R 16/0232
See application file for complete search history.

(56) References Cited

U.S. PATENT DOCUMENTS

| 9,441,408 B2 | 9/2016 | Matsumoto et al. |
| 2011/0128018 A1* | 6/2011 | Reime ................... H01H 3/142 324/679 |

(Continued)

FOREIGN PATENT DOCUMENTS

| JP | 2015174633 A | 10/2015 |
| JP | 2016097809 A | 5/2016 |

(Continued)

OTHER PUBLICATIONS

U.S. Appl. No. 17/016,487; First Named Inventor: Michihiko Matsumoto; Title: "Protector With Sensor"; filed Sep. 10, 2020.

(Continued)

*Primary Examiner* — Jason S Morrow
(74) *Attorney, Agent, or Firm* — Holtz, Holtz & Volek PC (57) ABSTRACT

An inner-cabin side part of a hollow part of a protector with a sensor extends between a top end and an inner-cabin side end with an inner-cabin side apex closest to an interior of an automobile body. A distance is shorter between the inner-cabin side apex and the inner-cabin side end than between the top end and the inner-cabin side apex. An outer-cabin side part of the hollow part extends between the top end and an outer-cabin side end with an outer-cabin side apex closest to an exterior of the automobile body. A distance is shorter between the outer-cabin side apex and the outer-cabin side end than between the top end and the outer-cabin side apex. Thicknesses of an outer coat of the hollow part are increased toward the apexes from the top end, and are uniform between the apexes and the inner-cabin side end and the outer-cabin side end.

4 Claims, 5 Drawing Sheets

(51) Int. Cl.
*E05F 15/44* (2015.01)
*G01V 3/00* (2006.01)
*B60J 5/04* (2006.01)

(56) References Cited

U.S. PATENT DOCUMENTS

| | | | | |
|---|---|---|---|---|
| 2013/0307567 | A1* | 11/2013 | Bolbocianu | G01D 11/30 |
| | | | | 324/661 |
| 2015/0042361 | A1* | 2/2015 | Matsuda | B60J 10/273 |
| | | | | 324/661 |
| 2015/0267453 | A1* | 9/2015 | Matsumoto | H01H 3/142 |
| | | | | 49/27 |
| 2016/0144802 | A1* | 5/2016 | Hirakawa | E05F 15/44 |
| | | | | 296/1.08 |
| 2016/0145927 | A1* | 5/2016 | Hirakawa | B60J 10/246 |
| | | | | 296/1.04 |
| 2020/0157872 | A1 | 5/2020 | Matsumoto et al. | |
| 2020/0223295 | A1 | 7/2020 | Matsumoto et al. | |

FOREIGN PATENT DOCUMENTS

| | | |
|---|---|---|
| JP | 2019187133 A | 10/2019 |
| JP | 2021062664 A | 4/2021 |

OTHER PUBLICATIONS

U.S. Appl. No. 17/029,105; First Named Inventor: Hiroshi Ishibashi; Title: "Protector With Sensor" filed Sep. 23, 2020.

\* cited by examiner

PROTECTOR WITH SENSOR

CROSS REFERENCE TO RELATED APPLICATION

This application claims the benefit under 35 USC § 119 of JP Patent Application JP 2019-187136 filed Oct. 10, 2019, the entire disclosure of which is incorporated herein by reference.

BACKGROUND INFORMATION

The present invention relates to a protector with a sensor. When an object including a finger is disposed between an opening of an automobile body and a sliding door, the sensor fixed in the protector outputs a corresponding signal upon detecting the object. The sliding door is for use on a wagon, a station wagon, or the like and moves between at least two positions to open and close the opening of the automobile body.

Figure 5:
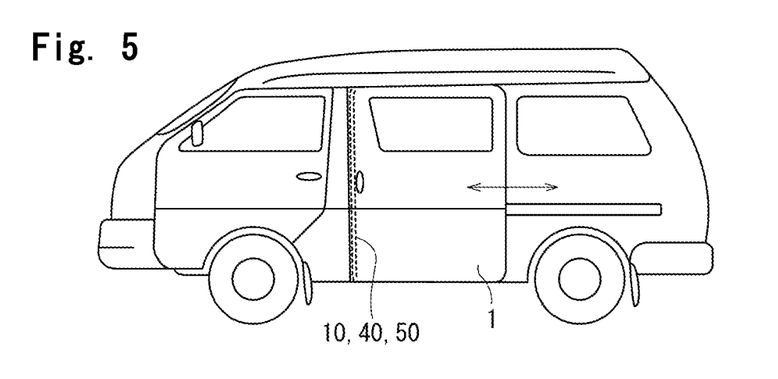
FIG. 5 is a side view of an automobile with a sliding door which opens and closes an opening of an automobile body.

A protector 10 with a sensor couples to an automobile including a wagon illustrated in FIG. 5. A sliding door 1 of the wagon opens and closes the opening of the automobile body.

Figure 6:
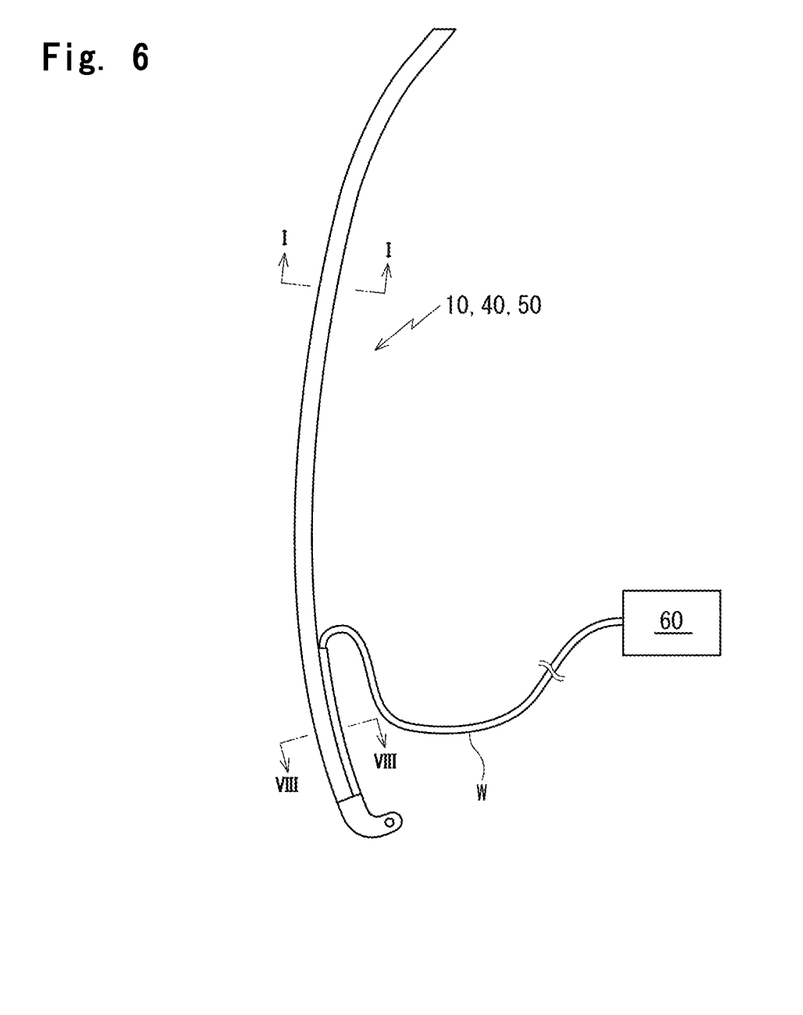
FIG. 6 is a side view of a protector illustrated in FIG. 5 with a sensor.

The protector 10 couples to a front end surface of the sliding door 1 and extends toward a front part of the automobile body from the front end surface. The protector 10 extends in an upper and lower direction of the automobile body as illustrated in FIG. 6.

Figure 7:
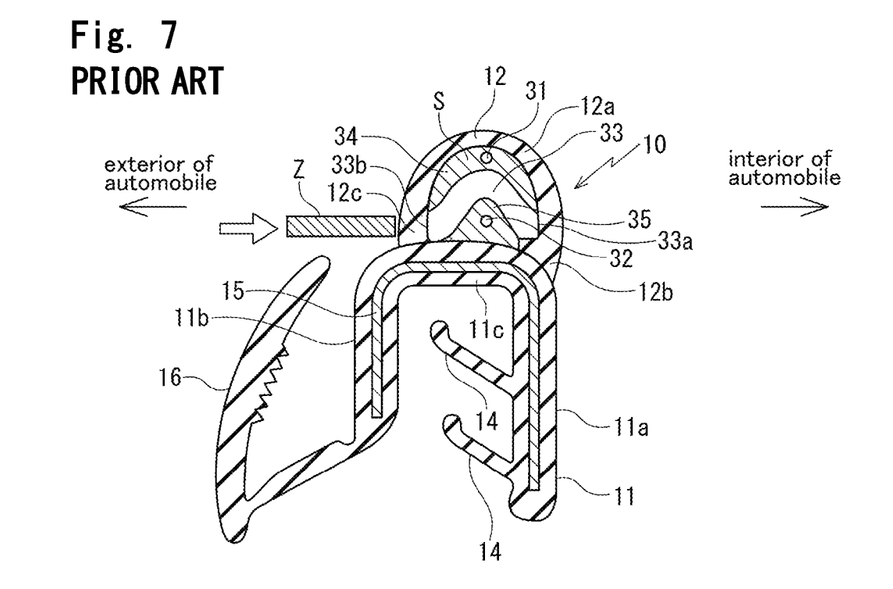
FIG. 7 is an enlarged cross sectional view of a protector according to a prior art taken along line I-I of FIG. 6 with a sensor.
Figure 8:
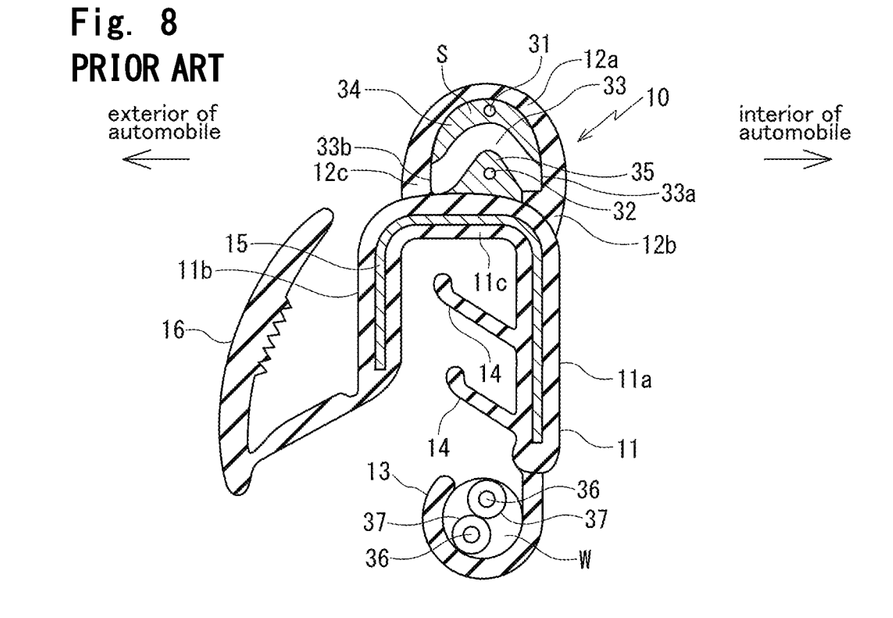
FIG. 8 is an enlarged cross sectional view of the protector according to the prior art taken along line VIII-VIII of FIG. 6 with the sensor.

In this connection, Japanese unexamined Patent Publication No. 2015-174633 is directed to the protector 10. As illustrated in FIG. 7 and FIG. 8, the protector 10, which couples to the front end surface of the sliding door 1, includes an installation base member 11 and a hollow part 12. The installation base member 11 has a substantially U-shaped cross section including an inner-cabin side wall 11a, an outer-cabin side wall 11b, and a connecting wall 11c. The hollow part 12 is integrally formed with the installation base member 11. The hollow part 12 includes a sensor (pressure sensitive sensor) S. The sensor S outputs a corresponding electric signal upon detecting the object such as a part of human bodies (fingers, hands, or legs) between the sliding door 1 and the opening of the automobile body (may also be a front door or a side door).

An outer peripheral surface of the hollow part 12 is an outer coat 12a. The outer coat 12a has a substantially horseshoe-shaped cross section and has an inner-cabin side end 12b and an outer-cabin side end 12c. Each of the inner-cabin side end 12b and the outer-cabin side end 12c are connected with the installation base member 11 and are at a distance from each other along the installation base member 11.

In a lower part of the protector 10, a channel part 13 is integrally formed with the inner-cabin side wall 11a of the installation base member 11. The channel part 13 has a substantially C-shaped cross section and holds a wire harness W. The wire harness W is joined with the pressure sensitive sensor S. The installation base member 11 has a plurality of holding lips 14, 14 formed inside and a core 15 embedded. The core 15 has a substantially U-shaped cross section and increases rigidity of the installation base member 11. In addition, a decorative lip 16 is provided on the outer-cabin side wall 11b of the installation base member 11.

The sensor (pressure sensitive sensor) S is fixed in the hollow part 12. The hollow part 12 has two core wires (electrode wires) 31, 32, rubber like elastic bodies 34, 35, and a space 33. The core wires 31, 32 extend in an upper and lower direction (longitudinal direction) of the hollow part 12 and are embedded in the rubber like elastic bodies (first and second conductive parts) 34, 35. The rubber like elastic bodies 34, 35 have electric conductivity. The space 33 is positioned between the rubber like elastic bodies 34, 35. When the object is disposed between the sliding door 1 and the opening when the sliding door 1 is moved towards a closed position, and makes contact with a part of the hollow part 12, the rubber like elastic bodies 34, 35 come into contact with each other and the two core wires 31, 32 short-circuit. Resultant change in electric signal is transmitted to a control unit 60 by leads 36, 36, and as a result, the object is detected. The leads 36, 36 are connected with the two core wires 31, 32 in a lower side terminal part of the protector 10. The leads 36, 36 are covered with insulator and are tied by the wire harness W. Top ends of the leads 36, 36 are bared from covered parts 37 and are naked wires.

The rubber like elastic bodies (first and second conductive parts) 34, 35 include the first conductive part 34 on an upper part of the hollow part and the second conductive part 35 on a lower part of the hollow part. The first conductive part 34 has a concave shape and the second conductive part 35 has a convex shape in cross section of the hollow part 12. The first and second conductive parts 34, 35 are shaped and positioned in a manner that the space 33, positioned between the first conductive part 34 and the second conductive part 35, has a substantially V-shaped cross section, the space 33 has a substantially uniform width in cross section, and an opening of the V-shaped cross section faces the installation base member 11. With this configuration, the sensor (pressure sensitive sensor) S detects the objects over a wider range.

Parts of an inner peripheral surface of the hollow part 12 without the first and second conductive parts 34, 35, in other words where an inner-cabin space end 33a and an outer-cabin space end 33b of the space 33 are defined, are weak in strength. Accordingly, in case convex substances Z, keys for example, strongly touch the parts weak in strength while passengers are getting on or off the automobiles, the parts may be damaged or torn. In this connection, as illustrated in FIG. 8, thicknesses of the inner-cabin side end 12b and the outer-cabin side end 12c of the hollow part 12 are increased. Increasing the thicknesses of the inner-cabin side end 12b and the outer-cabin side end 12c is effective, for the parts where the inner-cabin space end 33a and the outer-cabin space end 33b of the space 33 are defined are easy to catch the convex substances Z, and therefore, are easily damaged or torn.

Once the hollow part 12 is torn, rainwater or water for car washing infiltrates and sensor function is lost. The absence of the sensor function may cause malfunction including improper opening or closing of the sliding door 1.

Also, Japanese unexamined Patent Publication No. 2016-097809 is directed to a hollow part which has a substantially lozenge-shaped cross section. A first apex and a second apex of the hollow part have curved surfaces and are curved toward an exterior and an interior of an automobile body, respectively, to release force applied on the hollow part from the convex substances Z. A distance between first and second base roots of the hollow part are too short from each other along the installation base member. In addition, distances between the first apex and the first base root and between the second apex and the second base root are long, for the first and second apexes are at substantial centers between an upper end of the hollow part and the first and second base roots. With this configuration, parts of the hollow part closer to the first and second base roots than the first and second apexes are decreased in rigidity. In case the convex substances Z diagonally touch the hollow part relative to the flange, the hollow part easily leans, and is decreased in precise sensitivity required for tactile detection of the objects.

Unfortunately, however, the inner-cabin side end 12b and the outer-cabin side end 12c of the hollow part 12 of the protector 10 illustrated in FIG. 7 and FIG. 8, which are increased in thicknesses, form pillar parts. The pillar parts increase load to be applied on the hollow part 12.

In other words, the pillar parts prevent the hollow part 12 from bending in a front and rear direction of the automobile body. This configuration may degrade precise sensitivity of the sensor (pressure sensitive sensor) S for detecting the objects.

Therefore, an object of the present invention is to provide the protector with the sensor capable of preventing the damages caused by the objects which touch the hollow part. It is another object of the present invention to provide the protector with the sensor improved in sensibility.

SUMMARY

In order to achieve the above-mentioned object, according to one aspect of the invention, a protector (50) with a sensor is provided. The protector (50) includes an installation base member (11) and a hollow part (52). The installation base member (11) couples to a flange (F) of a sliding door (1). The flange (F) protrudes toward a front part of an automobile body from a front edge of the sliding door (1). The sliding door (1) moves between at least two positions to open and close a door opening of the automobile body. The installation base member (11) has a substantially U-shaped cross section including an inner-cabin side wall (11a), an outer-cabin side wall (11b), and a connecting wall (11c). The connecting wall (11c) connects the side walls (11a, 11b). The installation base member (11) extends in an upper and lower direction of the automobile body. The hollow part (52) is unified with the connecting wall (11c) of the installation base member (11) and extends toward the front part of the automobile body. The hollow part (52) has a shape of a tube. The hollow part (52) has core wires (31, 32), first and second conductive parts (54, 55), and a space (53). Each of the first and second conductive parts (54, 55) have a respective one of the core wires (31, 32) embedded. The space (53) is positioned between the first and second conductive parts (54, 55).

The hollow part (52) has an inner-cabin side end (52b) and an outer-cabin side end (52c). Each of the inner-cabin side end (52b) and the outer-cabin side end (52c) are connected with the installation base member (11) and are at a distance from each other along the installation base member (11).

The first and second conductive parts (54, 55) include the first conductive part (54) on an upper part of the hollow part and the second conductive part (55) on a lower part of the hollow part. The second conductive part (55) has a convex shape in cross section of the hollow part (52). The second conductive part (55) is positioned within the hollow part (52) between the inner-cabin side end (52b) and the outer-cabin side end (52c) adjacent the installation base member (11). The first conductive part (54) has a concave shape in cross section of the hollow part (52). The first conductive part (54) is spaced apart from the second conductive part (55). The first and second conductive parts (54, 55) are shaped and positioned in a manner that the space (53) has a substantially V-shaped cross section, an opening of the V-shaped cross section faces the installation base member (11), and an inner-cabin space end (53a) and an outer-cabin space end (53b) of the space (53) are defined on an inner surface of an outer coat (52a) of the hollow part (52).

When an object is disposed between the sliding door (1) and the opening, and makes contact with the hollow part (52) when the sliding door (1) is moved towards a closed position, an electric signal provides an indication that the object is in the opening.

An inner-cabin side part of the outer coat (52a) of the hollow part (52) extends between a top end (P) and an inner-cabin side end (52b), and is curved toward an interior of the automobile body with an inner-cabin side apex (52d) on a part closest to the interior of the automobile body. A distance (L5) in a height direction between the inner-cabin side apex (52d) and a point (Q) is shorter than a distance (L4) in the height direction between the top end (P) and the apex (52d). The point (Q) is a part of the inner-cabin side end (52b) closest to the interior of the automobile body.

An outer-cabin side part of the outer coat (52a) of the hollow part (52) extends between the top end (P) and an outer-cabin side end (52c), and is curved toward an exterior of the automobile body with an outer-cabin side apex (52e) on a part closest to the exterior of the automobile body. A distance (L7) in the height direction between the apex (52e) and a point (R) is shorter than a distance (L6) in the height direction between the top end (P) and the apex (52e). The point (R) is a part of the outer-cabin side end (52c) closest to the exterior of the automobile body.

Thicknesses of the outer coat (52a) of the hollow part (52) are gradually increased toward the apex (52d) from the top end (P) and toward the apex (52e) from the top end (P). Thicknesses of the outer coat (52a) between the apex (52d) and the inner-cabin side end (52b) and between the apex (52e) and the outer-cabin side end (52c) are equal to or not less than thicknesses (t). The thicknesses (t) are the thicknesses of the outer coat (52a) on each of the apexes (52d, 52e).

It is to be noted that the "change in electric signal" includes a change by short between the two core wires, and a change in capacitance.

In addition, according to an aspect of the present invention, the second conductive part (55) has a ridge-shaped cross section. The ridge-shaped cross section has an apex (55a) thicker than at least one other part of the second conductive part (55) in a front and rear direction of the automobile body and slopes toward the inner-cabin side end (52b) and the outer-cabin side end (52c) from the apex (55a). The space (53) has a substantially uniform width in cross section.

In addition, according to an aspect of the present invention, the second conductive part (55) has a hanging-bell-shaped cross section. The space (53) has widths (Y) on each of the apexes (52d, 52e). The widths (Y) are greater than at least one other part of the space (53). The widths (Y) of the space (53) are gradually decreased toward the installation base member (11) from each of the apexes (52d, 52e).

In addition, according to an aspect of the present invention, the inner-cabin space end (53a) and the outer-cabin space end (53b) of the space (53) have curved surfaces and are defined on the inner surface of the outer coat (52a) of the hollow part (52).

Symbols in parentheses show constituents or items corresponding to the drawings.

According to the present invention, the inner-cabin side part of the outer coat of the hollow part extends between the top end and the inner-cabin side end, and is curved toward the interior of the automobile body with the inner-cabin side apex on the part closest to the interior of the automobile body. The outer-cabin side part of the outer coat of the hollow part extends between the top end and the outer-cabin side end, and is curved toward the exterior of the automobile body with the outer-cabin side apex on the part closest to the exterior of the automobile body. The resultant hollow part is easy to shrink in the front and rear direction of the automobile body in the same manner as a pantograph, and is more suitable for detecting the objects.

In addition, the distance in the height direction between the inner-cabin side apex and the part of the inner-cabin side end closest to the interior of the automobile body is shorter than the distance in the height direction between the top end and the inner-cabin side apex. In the same manner, the distance in the height direction between the outer-cabin side apex and the part of the outer-cabin side end closest to the exterior of the automobile body is shorter than the distance in the height direction between the top end and the outer-cabin side apex. Accordingly, on the inner-cabin side part and the outer-cabin side part of the hollow part, the distances between the apexes and base roots of the hollow part are shorter than the distances between the top end and the apexes. With this configuration, parts of the hollow part closer to the base roots than the apexes are increased in rigidity. In case convex substances diagonally touch the hollow part relative to the flange, the hollow part hardly leans, and is hardly decreased in precise sensitivity required for tactile detection of the objects.

In addition, the thicknesses of the outer coat of the hollow part are gradually increased toward the inner-cabin side apex from the top end and toward the outer-cabin side apex from the top end. The thicknesses of the outer coat between the inner-cabin side apex and the inner-cabin side end and between the outer-cabin side apex and the outer-cabin side end are equal to or not less than the thicknesses of outer coat on the inner-cabin side apex and on the outer-cabin side apex. Accordingly, thicknesses of parts of the outer coat of the hollow part on which each of the ends of the space are defined are increased. The space has the substantially V-shaped cross section.

Accordingly, in case convex substances, keys for example, strongly touch the parts while passengers are getting on or off the automobiles, the parts touched by the convex substances are not damaged or torn. The hollow part, not damaged or torn, prevents infiltration of water, and therefore, sensor function is not affected. This configuration prevents malfunction including improper opening or closing of the sliding door.

The hollow part of the protector of the present invention is easy to bend in the front and rear direction of the automobile body, and is stable in the precise sensitivity required for tactile detection of the objects in case the convex substances diagonally touch the hollow part. Also, the hollow part is small in deformation volume in the inner-cabin and outer-cabin direction and keeps abrasion as well as amount of bite by the convex substances, keys for example, low.

In addition, the second conductive part may have the ridge-shaped cross section. The ridge-shaped cross section has the apex thicker than at least one other part of the second conductive part in the front and rear direction of the automobile body and slopes toward the inner-cabin side end and the outer-cabin side end from the apex, and the space has the substantially uniform width in cross section. Alternatively, the second conductive part may have the hanging-bell-shaped cross section. The widths of the space on the inner-cabin side apex and the outer-cabin side apex are greater than at least one other part of the space, and are gradually decreased toward the installation base member from the inner-cabin side apex and from the outer-cabin side apex. The second conductive part which has the hanging-bell-shaped cross section, not the ridge-shaped cross section, is smaller in the deformation volume in the inner-cabin and outer-cabin direction and keeps abrasion as well as amount of bite by the convex substances, keys for example, lower.

In addition, the inner-cabin space end and the outer-cabin space end of the space have curved surfaces and are defined on the inner surface of the outer coat of the hollow part. With this configuration, the hollow part is easier to bend in the front and rear direction of the automobile body and the sensor is improved in sensibility.

DETAILED DESCRIPTION

Referring to the Drawings, a protector 50 according to an embodiment of the present invention with a sensor will be described. It is to be noted that "front and a rear" indicates a front and rear direction of an automobile body. "Upper and lower" used with respect to the automobile body indicates an upper and lower direction of the automobile body. "Upper" used with respect to the protector 50 indicates a part closer to a hollow part 52 and "lower" indicates a part closer to an installation base member 11.

Figure 1:
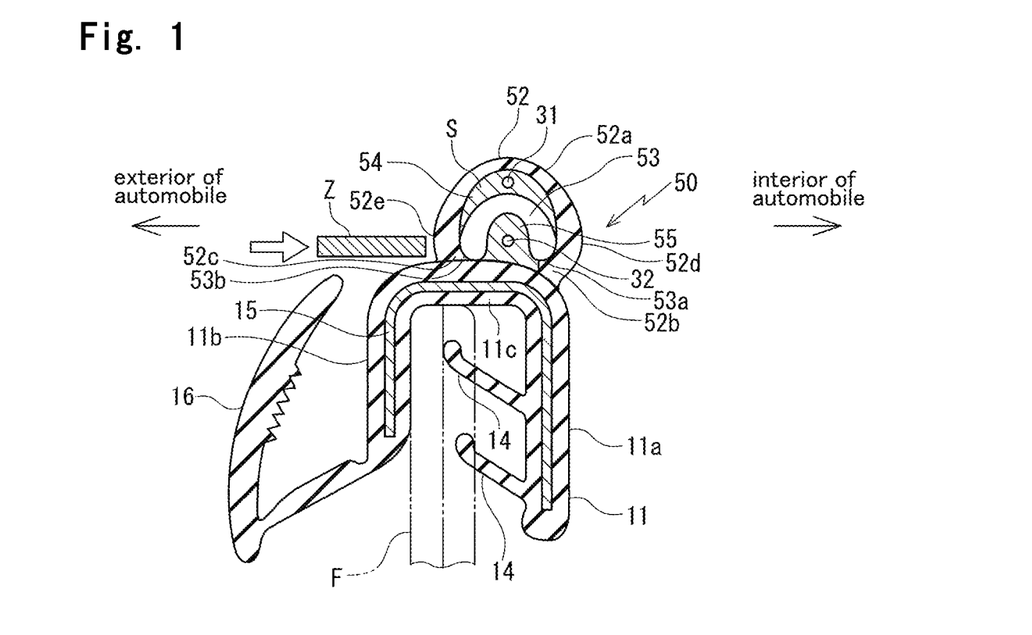
FIG. 1 is an enlarged cross sectional view of a protector according to an embodiment of the present invention taken along line I-I of FIG. 6 with a sensor.

The protector 50 couples to a front end surface of a sliding door 1 and extends toward a front part of an automobile body from the front end surface. The sliding door 1 moves between at least two positions to open and close an opening of the automobile body illustrated in FIG. 5. A sensor (pressure sensitive sensor) S is fixed in the protector 50 and outputs a corresponding electric signal upon detecting an object such as a part of human bodies (fingers, hands, or legs) between the sliding door 1 and the opening of the automobile body (may also be a front door or a side door). The present invention illustrated in FIG. 1 and the prior art illustrated in FIG. 7 share the configuration illustrated in FIG. 6 in common. FIG. 1 is an enlarged cross sectional view of the protector 50 taken along line I-I of FIG. 6 with the sensor (pressure sensitive sensor) S fixed. The present invention illustrated in FIG. 1 differs from the prior art illustrated in FIG. 7 in cross-sectional shapes of a hollow part 52, a space 53, and a second conductive part 55 on a lower part of the hollow part. When constituents or items correspond to those in prior arts, the same symbols are used.

As illustrated in FIG. 1, the protector 50 includes the installation base member 11, the hollow part 52, and the sensor (pressure sensitive sensor) S. The installation base member 11 directly couples to a flange F formed on the sliding door 1. The installation base member 11 has a substantially U-shaped cross section including an inner-cabin side wall 11a, an outer-cabin side wall 11b, and a connecting wall 11c. The hollow part 52 is integrally formed with the installation base member 11 and has a shape of a tube. The hollow part 52 makes contact with the object when the object including fingers is disposed between the front end surface of the sliding door 1 and the opening of the automobile body. The front end surface faces the opening of the automobile body. The sensor (pressure sensitive sensor) S is fixed in the hollow part 52 and outputs a corresponding electric signal upon detecting the object. The hollow part 52 has core wires (electrode wires) 31, 32, rubber like elastic bodies 54, 55, and a space 53. The core wires 31, 32 extend in an upper and lower direction (longitudinal direction which is a direction parallel to the peripheral edge of the opening) of the hollow part 52. Each of the rubber like elastic bodies 54, 55 have a respective one of the core wires 31, 32 embedded. The rubber like elastic bodies 54, 55 have electric conductivity. The space 53 is positioned between the rubber like elastic bodies 54, 55. The rubber like elastic bodies 54, 55, which have electric conductivity, include electric conductive rubber mainly composed of synthetic rubber including EPDM. The sensor S is integrally formed with the hollow part 52. The hollow part 12 does not have electric conductivity.

The installation base member 11 has a plurality of holding lips 14, 14 formed inside and a core 15 embedded. The core 15 has a substantially U-shaped cross section and increases rigidity of the installation base member 11. In addition, a decorative lip 16 is provided on the outer-cabin side wall 11b of the installation base member 11.

The hollow part 52 is integrally formed with the connecting wall 11c of the installation base member 11. A top end part of the hollow part 52 protrudes toward the front part of the automobile body.

Each of ends (an inner-cabin side end) 52b, (an outer-cabin side end) 52c of the hollow part 52 are connected with the connecting wall 11c and are at a distance from each other along the installation base member 11.

In the present embodiment, the inner-cabin side end 52b of the hollow part 52 is connected with a corner where the connecting wall 11c is connected with the inner-cabin side wall 11a. The outer-cabin side end 52c of the hollow part 52 is connected with a part of the connecting wall 11c slightly closer to the interior of the automobile body than a corner where the connecting wall 11c is connected with the outer-cabin side wall 11b. More specifically, in the present embodiment, the outer-cabin side end 52c is connected with the part of the connecting wall 11c closer to the exterior of the automobile body than a central line which divides the installation base member 11 in cross section in two equal halves in an inner-cabin and outer-cabin direction.

The rubber like elastic bodies 54, 55, which have electric conductivity, include a first conductive part 54 on an upper part of the hollow part and the second conductive part 55. The second conductive part 55 is positioned within the hollow part 52 between the inner-cabin side end 52b and the outer-cabin side end 52c adjacent the installation base member 11 and the first conductive part 54 is spaced apart from the second conductive part 55. The first conductive part 54 has the core wire 31 embedded at a center and the second conductive part 55 has the core wire 32 embedded at a center. In general, the rubber like elastic bodies 54, 55, which have electric conductivity, include solid materials without air bubbles.

Shapes and positions of the first and second conductive parts 54, 55 in the hollow part 52 determine the shape of the space 53 in cross section between first and second conductive parts 54, 55. In the present embodiment, the space 53 has a substantially V-shaped cross section with an opening of the V shape facing the installation base member 11. Also, an inner-cabin space end 53a and an outer-cabin space end 53b of the space 53 are defined on an inner surface of an outer coat 52a of the hollow part 52.

The inner-cabin space end 53a of the space 53, which has the substantially V-shaped cross section, is defined on the inner surface of the outer coat 52a of the hollow part 52 between an inner-cabin side apex 52d and the inner-cabin side end 52b. The outer-cabin space end 53b of the space 53 is defined on the inner surface of the outer coat 52a of the hollow part 52 between an outer-cabin side apex 52e and the outer-cabin side end 52c. The apexes 52d, 52e will be discussed hereinafter.

A part of the outer-cabin space end 53b of the space 53 is defined on the connecting wall 11c of the installation base member 11 as well as the inner surface of the outer coat 52a (the inner-cabin space end 53a of the space 53 is not defined on the connecting wall 11c).

Figure 2:
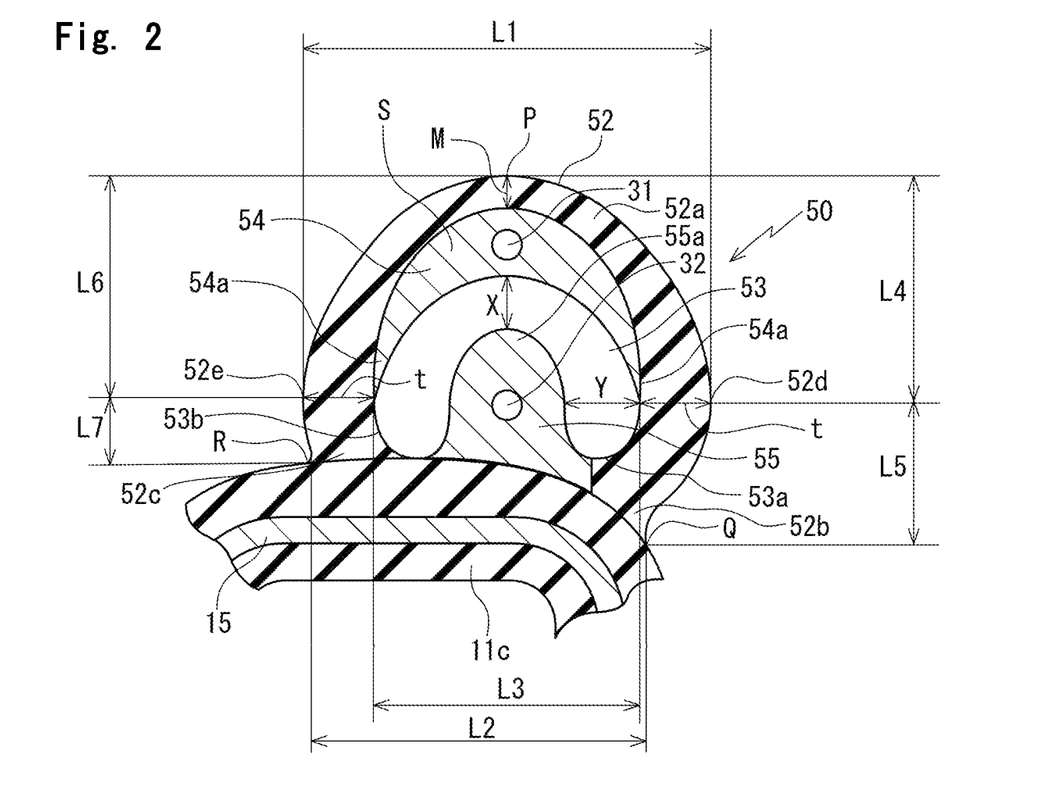
FIG. 2 is an enlarged cross sectional view of an important part of the protector illustrated in FIG. 1 with the sensor.

As illustrated in FIG. 2, the hollow part 52 includes the outer coat 52a. The outer coat 52a includes an inner-cabin side part and an outer-cabin side part. The inner-cabin side part of the outer coat 52a extends between a top end P and the inner-cabin side end 52b, and is curved toward the interior of the automobile with the apex 52d on a part closest to the interior of the automobile. The outer-cabin side part of the outer coat 52a extends between the top end P and the outer-cabin side end 52c, and is curved toward the exterior of the automobile with the apex 52e on a part closest to the exterior of the automobile. The resultant hollow part 52 in cross section shrinks in a front and rear direction of the automobile body in the same manner as a pantograph.

Each of the apexes 52d, 52e have curved surfaces. A distance on a curvilinear surface between the top end P of the hollow part 52 and the apex 52d is longer than a distance on the curvilinear surface between the apex 52d and the inner-cabin side end 52b. A distance on the curvilinear surface between the top end P and the apex 52e is longer than a distance on the curvilinear surface between the apex 52e and the outer-cabin side end 52c.

More specifically, as illustrated in FIG. 2, a distance L5 in a height direction between the apex 52d and a connecting point Q of the hollow part 52 is shorter than a distance L4 in the height direction between the top end P and the apex 52d. The connecting point Q is a part of the inner-cabin side end 52b closest to the interior of the automobile body. In the same manner, a distance L7 in the height direction between the apex 52e and a connecting point R of the hollow part 52 is shorter than a distance L6 in the height direction between the top end P and the apex 52e. The connecting point R is a part of the outer-cabin side end 52c closest to the exterior of the automobile body.

Further specifically, as illustrated in FIG. 2, the distance L5 is 0.7 time as long as the distance L4, and the distance L7 is 0.3 time as long as the distance L6.

Thicknesses of the outer coat 52a of the hollow part 52 are gradually increased toward the apex 52d from the top end P and toward the apex 52e from the top end P. The outer coat 52a has thicknesses "t" on each of the apexes 52d, 52e. The thicknesses "t" are not less than twice, twice in the present embodiment, a thickness M on the top end P of the hollow part 52.

While in the present embodiment the thicknesses of the outer coat 52a between the apex 52d and the inner-cabin side end 52b and between the apex 52e and the outer-cabin side end 52c are uniform in thicknesses "t", this should not be construed in a limiting sense. Another possible embodiment is that the thicknesses of the outer coat 52a are gradually increased toward the inner-cabin side end 52b from the apex 52d and toward the outer-cabin side end 52c from the apex 52e.

The second conductive part 55 has a hanging-bell-shaped cross section. A space 53 has a width X at a center of the space 53 in cross section in the front and rear direction of the automobile body (upper and lower direction of the hollow part 52). The width X is gradually increased toward each of the apexes 52d, 52e, and the space 53 has widths Y on each of the apexes 52d, 52e. The widths Y are greater than at least one other part of the space 53. The widths Y of the space 53 are gradually decreased toward the installation base member 11.

The inner-cabin space end 53a and the outer-cabin space end 53b of the space 53 have curved surfaces and are defined on the inner surface of the outer coat 52a of the hollow part 52.

The first conductive part 54 has a crescent-shaped cross section. Lower parts 54a, 54a of the first conductive part 54 are closer to the installation base member 11 than an apex 55a of the second conductive part 55. With this configuration, even in case the hollow part 52 slightly bends, the first and second conductive parts 54, 55 easily come into contact with each other, and do not pass each other on a point of contact.

In other words, as illustrated in FIG. 2, a distance L1 is longer than at least one other part of the hollow part 52 in cross section in the inner-cabin and outer-cabin direction. The distance L1 is between the apex 52d and the apex 52e. The distance L1 is longer than a distance L2. The distance L2 is between the connecting point Q and the connecting point R.

The distance L2 is longer than a distance L3. The distance L3 is longer than at least one other part of the space 53 in the inner-cabin and outer-cabin direction.

The installation base member 11 and the hollow part 52 of the protector 50 are formed by extrusion molding and include a rubber like elastic body without electric conductivity. The rubber like elastic body is composed of synthetic rubber such as EPDM, and thermoplastic elastomer such as TPO, TPS. Upper and lower side terminal parts of the protector 50 relative to the automobile body are formed by die molding to arrange external shapes of the terminal parts. Since the hollow part 52 of the protector 50 necessitates flexibility, the hollow part 52 may include a foamed sponge material. In the same manner, the installation base member 11 may include the foamed sponge material.

In the present embodiment, the hollow part 52 has a material hardness of 72 such that the hollow part 52 is temperately enhanced in load, not to excess (ordinary articles have a material hardness of substantially 67).

The inner-cabin side part of the outer coat 52a of the hollow part 52 extends between the top end P and the inner-cabin side end 52b, and is curved toward the interior of the automobile body with the apex 52d on the part closest to the interior of the automobile. The outer-cabin side part of the outer coat 52a of the hollow part 52 extends between the top end P and the outer-cabin side end 52c, and is curved toward the exterior of the automobile body with the apex 52e on the part closest to the exterior of the automobile. The resultant hollow part 52 is easy to shrink in the front and rear direction of the automobile body in the same manner as the pantograph, and is more suitable for detecting the objects.

In addition, the thicknesses of the outer coat 52a of the hollow part 52 are gradually increased toward the apex 52d from the top end P and toward the apex 52e from the top end P. The thicknesses of the outer coat 52a between the apex 52d and the inner-cabin side end 52b and between the apex 52e and the outer-cabin side end 52c are equal to the thicknesses "t". The thicknesses "t" are the thicknesses of the outer coat 52a on the apex 52d and on the apex 52e. Accordingly, thicknesses of parts of the outer coat 52a of the hollow part 52, on which each of the inner-cabin space end 53a and the outer-cabin space end 53b of the space 53 are defined, are increased. The space 53 has the substantially V-shaped cross section. Accordingly, in case convex substances Z, keys for example, strongly touch the parts while passengers are getting on or off the automobiles, the parts touched by the convex substances Z are not damaged or torn. The hollow part 52, not damaged or torn, prevents infiltration of water, and therefore, sensor function is not affected. This configuration prevents malfunction including improper opening or closing of the sliding door 1.

In addition, the inner-cabin space end 53a and the outer-cabin space end 53b of the space 53 have curved surfaces and are defined on the inner surface of the outer coat 52a of the hollow part 52. With this configuration, the hollow part 52 is easier to bend in the front and rear direction of the automobile body and the sensor S is improved in sensibility.

Figure 3:
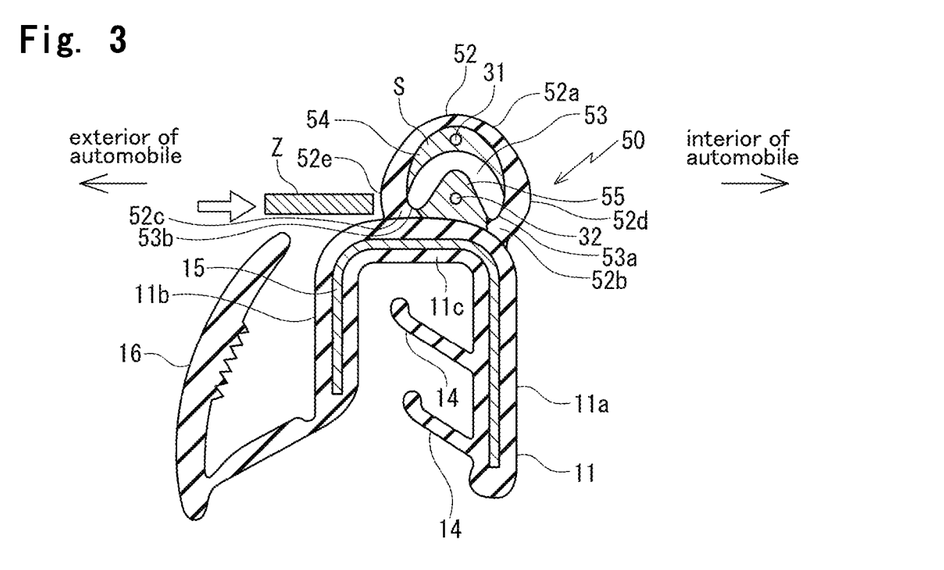
FIG. 3 is an enlarged cross sectional view of a protector according to another embodiment of the present invention taken along line I-I of FIG. 6 with the sensor.

In the present embodiment, as illustrated in FIG. 1 and FIG. 2, the second conductive part 55 has the hanging-bell-shaped cross section. The space 53 has the width X at the center, the width X is gradually increased toward each of the apexes 52d, 52e, and the space 53 has widths Y on each of the apexes 52d, 52e. The widths Y are greater than at least one other part of the space 53, and are gradually decreased toward the installation base member 11. But, this should not be construed in a limiting sense. Another possible embodiment is, as illustrated in FIG. 3, that the second conductive part 55 has the ridge-shaped cross section. The ridge-shaped cross section has the apex 55a thicker than at least one other part of the second conductive part 55 in the front and rear direction of the automobile body and slopes toward the inner-cabin side end 55a and the outer-cabin side end 55b from the apex 55a. With this configuration, the space 53 has the substantially uniform width in cross section.

The inner-cabin space end 53a and the outer-cabin space end 53b of the space 53 have curved surfaces and are defined on the inner surface of the outer coat 52a of the hollow part 52. A part of the outer-cabin space end 53b of the space 53 is defined on the connecting wall 11c of the installation base member 11 as well as the inner surface of the outer coat 52a.

Another possible embodiment is that the hollow part 52 and the sensor S are integrally formed, and the installation base member 11 is separately formed (illustration omitted).

While in the present embodiment the installation base member 11 has the plurality of holding lips 14, 14 formed inside and the core 15, having the substantially U-shaped cross section, embedded, this should not be construed in a limiting sense. Another possible embodiment is that the installation base member 11 has a singular holding lip 14 or does not have the core 15 embedded.

Figure 4:
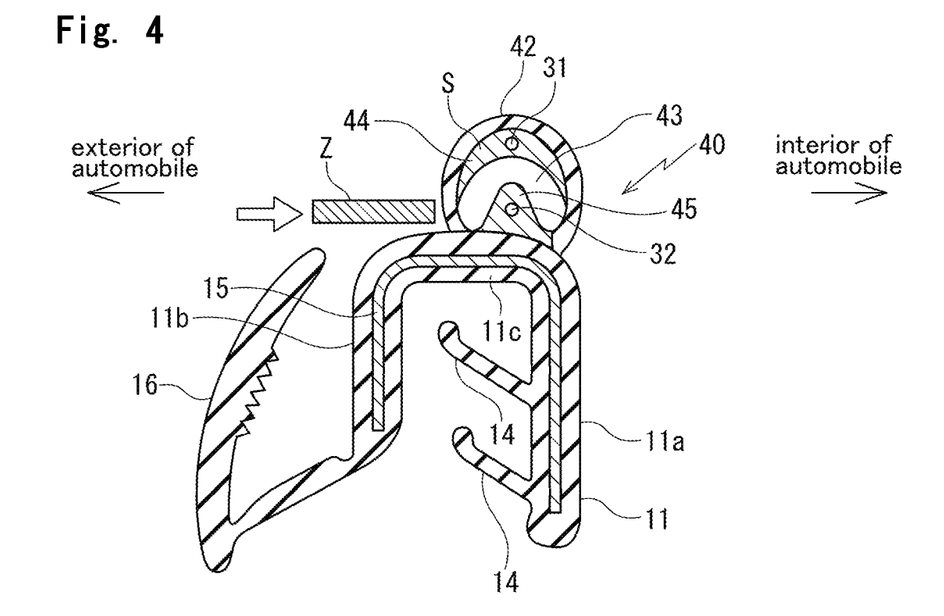
FIG. 4 is an enlarged cross sectional view of a protector for use as a comparative embodiment taken along line I-I of FIG. 6 with the sensor, with a hollow part modified.

A screwdriver in substitution for the convex substance Z was vertically pressed from the exterior of the automobile body against the hollow part 52 of the protector 50, illustrated in FIG. 1, the hollow part 52 of the protector 50, illustrated in FIG. 3, and a hollow part 42 of a protector 40, illustrated in FIG. 4. The hollow part 52, illustrated in FIG. 1, has the pantograph-shaped cross section, and includes the second conductive part 55, which has the hanging-bell-shaped cross section. The hollow part 52, illustrated in FIG. 3, has the pantograph-shaped cross section, and includes the second conductive part 55, which has the ridge-shaped cross section. The hollow part 42, illustrated in FIG. 4, has an elliptic cross section (egg-shaped cross section), and includes a second conductive part 45, which has the ridge-shaped cross section in the same manner as the second conductive part 55 in FIG. 3. The elliptic cross section extends in the front and rear direction of the automobile body.

Table 1 shows results of comparison among the hollow parts 42, 52, 52.

TABLE 1

| | deformation volume in inner-cabin and outer-cabin direction | amount of bite by screwdriver | degree of abrasion by screwdriver |
|---|---|---|---|
| FIG. 4 egg-shaped hollow part & ridge-shaped conductive part | large | large | large |
| FIG. 3 pantograph-shaped hollow part & ridge-shaped conductive part | middle | middle | middle |
| FIG. 1 pantograph-shaped hollow part & hanging-bell-shaped conductive part | small | small | small |

The results show that the hollow part 52, illustrated in FIG. 1, is the smallest in the deformation volume in the inner-cabin and outer-cabin direction and keeps abrasion as well as amount of bite of the outer-cabin side end 52c of the hollow part 52 by the screwdriver smallest. The hollow part 52, illustrated in FIG. 1, has the pantograph-shaped cross section, and includes the second conductive part 55, which has the hanging-bell-shaped cross section.

We claim:

1. A protector with a sensor, the protector being operably couplable to a flange of a sliding door of an automobile, the flange protruding toward a front part of an automobile body of the automobile from a front edge of the sliding door, the sliding door being movable between at least two positions to open and close a door opening of the automobile body, and the protector comprising:

an installation base member operably couplable to the flange, the installation base member having a substantially U-shaped cross section including an inner-cabin side wall, an outer-cabin side wall, and a connecting wall which connects the side walls, and the installation base member extending in an upper and lower direction of the automobile body; and a hollow part unified with the connecting wall of the installation base member and extending toward the front part of the automobile body, the hollow part having a shape of a tube, the hollow part having core wires, first and second conductive parts, and a space, each of the first and second conductive parts having a respective one of the core wires embedded therein, the space being positioned between the first and second conductive parts, the hollow part having an inner-cabin side end and an outer-cabin side end each being connected with the installation base member, the inner-cabin side end and the outer-cabin side end being at a distance from each other along the installation base member, the first and second conductive parts including the first conductive part on an upper part of the hollow part and the second conductive part on a lower part of the hollow part, the second conductive part having a convex shape in cross section of the hollow part, the second conductive part being positioned within the hollow part between the inner-cabin side end and the outer-cabin side end adjacent the installation base member, the first conductive part having a concave shape in cross section of the hollow part, the first conductive part being spaced apart from the second conductive part, the first and second conductive parts being shaped and positioned in a manner that the space has a substantially V-shaped cross section, an opening of the V-shaped cross section facing the installation base member, and an inner-cabin space end and an outer-cabin space end of the space being defined on an inner surface of an outer coat of the hollow part, wherein:

when an object is disposed between the sliding door and the opening, and makes contact with the hollow part when the sliding door is moved towards a closed position, an electric signal provides an indication that the object is in the opening, an inner-cabin side part of the outer coat of the hollow part extends between a top end and the inner-cabin side end, the inner-cabin side part is curved toward an interior of the automobile body with an inner-cabin side apex on a part closest to the interior of the automobile body, and a distance in a height direction between the inner-cabin side apex and a part of the inner-cabin side end closest to the interior of the automobile body is shorter than a distance in the height direction between the top end and the inner-cabin side apex, an outer-cabin side part of the outer coat of the hollow part extends between the top end and the outer-cabin side end, the outer-cabin side part is curved toward an exterior of the automobile body with an outer-cabin side apex on a part closest to the exterior of the automobile body, and a distance in the height direction between the outer-cabin side apex and a part of the outer-cabin side end closest to the exterior of the automobile body is shorter than a distance in the height direction between the top end and the outer-cabin side apex, thicknesses of the outer coat of the hollow part are gradually increased toward the inner-cabin side apex from the top end and toward the outer-cabin side apex from the top end, and the thicknesses of the outer coat between the inner-cabin side apex and the inner-cabin side end and between the outer-cabin side apex and the outer-cabin side end are equal to or not less than thicknesses of the outer coat on the inner-cabin side apex and on the outer-cabin side apex, and the second conductive part has a ridge-shaped cross section, the ridge-shaped cross section has an apex thicker than at least one other part of the second conductive part and slopes toward the inner-cabin side end and the outer-cabin side end from the apex, and the space has a substantially uniform width in cross section.

2. A protector with a sensor, the protector being operably couplable to a flange of a sliding door of an automobile, the flange protruding toward a front part of an automobile body of the automobile from a front edge of the sliding door, the sliding door being movable between at least two positions to open and close a door opening of the automobile body, and the protector comprising:

an installation base member operably couplable to the flange, the installation base member having a substantially U-shaped cross section including an inner-cabin side wall, an outer-cabin side wall, and a connecting wall which connects the side walls, and the installation base member extending in an upper and lower direction of the automobile body; and a hollow part unified with the connecting wall of the installation base member and extending toward the front part of the automobile body, the hollow part having a shape of a tube, the hollow part having core wires, first and second conductive parts, and a space, each of the first and second conductive parts having a respective one of the core wires embedded therein, the space being positioned between the first and second conductive parts, the hollow part having an inner-cabin side end and an outer-cabin side end each being connected with the installation base member, the inner-cabin side end and the outer-cabin side end being at a distance from each other along the installation base member, the first and second conductive parts including the first conductive part on an upper part of the hollow part and the second conductive part on a lower part of the hollow part, the second conductive part having a convex shape in cross section of the hollow part, the second conductive part being positioned within the hollow part between the inner-cabin side end and the outer-cabin side end adjacent the installation base member, the first conductive part having a concave shape in cross section of the hollow part, the first conductive part being spaced apart from the second conductive part, the first and second conductive parts being shaped and positioned in a manner that the space has a substantially V-shaped cross section, an opening of the V-shaped cross section facing the installation base member, and an inner-cabin space end and an outer-cabin space end of the space being defined on an inner surface of an outer coat of the hollow part, wherein:

when an object is disposed between the sliding door and the opening, and makes contact with the hollow part when the sliding door is moved towards a closed position, an electric signal provides an indication that the object is in the opening, an inner-cabin side part of the outer coat of the hollow part extends between a top end and the inner-cabin side end, the inner-cabin side part is curved toward an interior of the automobile body with an inner-cabin side apex on a part closest to the interior of the automobile body, and a distance in a height direction between the inner-cabin side apex and a part of the inner-cabin side end closest to the interior of the automobile body is shorter than a distance in the height direction between the top end and the inner-cabin side apex, an outer-cabin side part of the outer coat of the hollow part extends between the top end and the outer-cabin side end, the outer-cabin side part is curved toward an exterior of the automobile body with an outer-cabin side apex on a part closest to the exterior of the automobile body, and a distance in the height direction between the outer-cabin side apex and a part of the outer-cabin side end closest to the exterior of the automobile body is shorter than a distance in the height direction between the top end and the outer-cabin side apex, thicknesses of the outer coat of the hollow part are gradually increased toward the inner-cabin side apex from the top end and toward the outer-cabin side apex from the top end, and the thicknesses of the outer coat between the inner-cabin side apex and the inner-cabin side end and between the outer-cabin side apex and the outer-cabin side end are equal to or not less than thicknesses of the outer coat on the inner-cabin side apex and on the outer-cabin side apex, and the second conductive part has a hanging-bell-shaped cross section, the space has widths on the inner-cabin side apex and on the outer-cabin side apex greater than at least one other part of the space, and the widths of the space are gradually decreased toward the installation base member from the inner-cabin side apex and from the outer-cabin side apex.

3. The protector as claimed in claim 1, wherein an inner-cabin space end and an outer-cabin space end of the space have curved surfaces and are defined on the inner surface of the outer coat of the hollow part.

4. The protector as claimed in claim 2, wherein an inner-cabin space end and an outer-cabin space end of the space have curved surfaces and are defined on the inner surface of the outer coat of the hollow part.

* * * * *